United States Patent
Bando et al.

(10) Patent No.: US 9,242,508 B2
(45) Date of Patent: Jan. 26, 2016

(54) OMNI-DIRECTIONAL WHEEL AND OMNI-DIRECTIONAL VEHICLE INCLUDING THE SAME

(71) Applicant: WHILL, Inc., Tsurumi-ku, Yokohama-shi (JP)

(72) Inventors: Kazuo Bando, Kanagawa (JP); Junpei Naito, Kanagawa (JP)

(73) Assignee: WHILL, Inc., Tsurumi-ku, Yokohama-shi (JP)

( * ) Notice: Subject to any disclaimer, the term of this patent is extended or adjusted under 35 U.S.C. 154(b) by 0 days.

(21) Appl. No.: 14/524,216

(22) Filed: Oct. 27, 2014

(65) Prior Publication Data

US 2015/0115694 A1 Apr. 30, 2015

(30) Foreign Application Priority Data

Oct. 29, 2013 (JP) .................................. 2013-224336

(51) Int. Cl.
*B60B 19/12* (2006.01)
*B60B 19/00* (2006.01)

(52) U.S. Cl.
CPC ............... *B60B 19/003* (2013.01); *B60B 19/12* (2013.01)

(58) Field of Classification Search
CPC ...... B60B 19/003; B60B 19/12; B60B 19/125
USPC ....................................................... 301/5.23
See application file for complete search history.

(56) References Cited

U.S. PATENT DOCUMENTS

| | | | | |
|---|---|---|---|---|
| 5,720,529 A | * | 2/1998 | Barron | A63C 17/24 301/5.23 |
| 6,315,109 B1 | * | 11/2001 | Dean | B60P 1/02 193/35 MD |
| 6,547,340 B2 | * | 4/2003 | Harris | B60B 19/003 180/20 |
| 7,318,628 B2 | * | 1/2008 | Guile | B60B 19/003 16/47 |
| 7,566,102 B2 | * | 7/2009 | Guile | B60B 19/003 301/5.1 |
| 7,621,355 B2 | * | 11/2009 | Chu | B60B 19/003 180/7.2 |
| 7,980,335 B2 | * | 7/2011 | Potter | B60B 19/003 180/7.1 |
| 2006/0125309 A1 | | 6/2006 | Huang et al. | |

FOREIGN PATENT DOCUMENTS

| | | |
|---|---|---|
| JP | 2001-191704 | 7/2001 |
| JP | 2003-118305 | 4/2003 |
| JP | 2005-067334 | 3/2005 |
| JP | 36-82248 | 5/2005 |

(Continued)

*Primary Examiner* — John Walters
*Assistant Examiner* — James Triggs
(74) *Attorney, Agent, or Firm* — Knobbe, Martens, Olson & Bear, LLP (57) ABSTRACT

The omni-directional wheel includes first support parts and second support parts which support large-diameter rollers and small-diameter rollers. Each of the first support parts is disposed at a position where the first support part is held between a pair of the large-diameter rollers, while each of the second support parts is disposed at a position where the second support part is held between a pair of the small-diameter rollers. The large-diameter rollers and the small-diameter rollers are disposed such that their outlines are arranged on a single circumference, with a part of the small diameter-side end face of the small-diameter rollers partially inserted in the recessed portions of the large-diameter rollers.

8 Claims, 6 Drawing Sheets

(56) References Cited

FOREIGN PATENT DOCUMENTS

| JP | 2006-168659 | 6/2006 |
| JP | 2008-290638 | 12/2008 |
| JP | 2010-006353 A | 1/2010 |
| JP | 2013-189068 | 9/2013 |
| WO | WO 86/03132 A1 | 6/1986 |
| WO | WO 93/02872 | 2/1993 |
| WO | WO 2006/068007 | 6/2006 |

* cited by examiner

OMNI-DIRECTIONAL WHEEL AND OMNI-DIRECTIONAL VEHICLE INCLUDING THE SAME

CROSS-REFERENCE TO RELATED APPLICATIONS

This application is based on Japanese Patent Application No. 2013-224336, the contents of which are incorporated herein by reference in its entirety.

TECHNICAL FIELD

The present disclosure relates to an omni-directional wheel and an omni-directional vehicle including the same.

BACKGROUND ART

Conventionally, there is known a wheel with a plurality of rotary bodies each including multiple rotary rollers, with each rotary roller rotating in a lateral direction perpendicular to the straight forward direction of a vehicle and disposed around an axle (e.g., see Patent Literature 1).

In the wheel with rotary bodies described in Patent Literature 1, the rotary bodies are disposed with the leading end of each rotary body partially inserted into a recessed portion formed in the base end of an adjacent rotary body so that no clearance is created between the circumferential surfaces of the adjacent rotary bodies. Furthermore, both ends of the rotary bodies are supported by an adjacent pair of bearing arms mounted on the circumferential surface of a rim (hub).

CITATION LIST

Patent Literature

{PTL 1}
The Publication of Japanese Patent No. 3682248

SUMMARY

Technical Problem

In the wheel with rotary bodies of Patent Literature 1, it is necessary to use a bearing arm of a special shape, which is curved so as to fit the shape of the recessed portion, in order to support the leading end partially inserted into the recessed portion of one of adjacent rotary bodies. Such arms of special shape are difficult to manufacture and expensive to make the arms highly rigid.

As disclosed herein, an omni-directional wheel, which can support rollers in a simple structure, and an omni-directional vehicle which uses this omni-directional wheel are provided.

Solution to Problem

In order to achieve the above object, the present disclosure provides the following solutions:

An omni-directional wheel according to one aspect of the present disclosure includes: a rotary member rotatably provided around an axle; a plurality of rollers which have axes extending in a direction perpendicular to a radial direction of the rotary members in a plane perpendicular to the axle; and support members which allow the rollers to be mounted on the rotary member so as to be rotatable around the respective axes, wherein: the rollers are formed in a substantially truncated conical shape, of which an outline has a curvature equal to the curvature of a circle centered at the axle, and of which a diameter changes monotonously from one end toward the other end in an axial direction, and the rollers include first rollers and second rollers each having a smaller diameter than that of the first rollers; the first rollers each include a recessed portion at a center of the small diameter-side end face; the support members include first support parts that support the first rollers, each of the first support parts being disposed at a position where it is held between a pair of the first rollers having their large diameter-side end faces facing each other; and second support parts that supports the second rollers, each of the second support parts being disposed at a position where it is held between a pair of the second rollers having their large diameter-side end faces facing each other, wherein the first support parts and the second support parts are alternately disposed in the circumferential direction of the rotary members, and wherein the first rollers and the second rollers are disposed such that their outlines are arranged on a single circumference with a part of the small diameter-side end face of the second rollers partially inserted in the recessed portion of the first rollers.

According to the omni-directional wheel of the one aspect of the present disclosure, a pair of large-diameter first rollers and a pair of small-diameter second rollers, each having their large diameter-side end faces facing each other, are supported by the first support parts and the second support parts which are alternately disposed in the circumferential direction of the rotary members rotatably provided around the axle. Since each of these support parts is disposed at a position where it is held between a pair of the rollers having their end faces facing each other, the support parts are not required to have a special shape which is curved so as to fit the shape of the recessed portion in the small diameter-side end face of the large-diameter first rollers. Therefore, it is possible to simplify the structure of the support members for supporting the multiple rollers disposed such that their outlines are arranged on a single circumference.

Moreover, according to the omni-directional wheel of the above-described aspect, each of the support parts is disposed at a position where it is held between a pair of the rollers having their end faces facing each other, and not at a position where the small diameter-side end face of the first roller and the small diameter-side end face of the second roller face each other. Therefore, it is possible to bring the first roller and the second roller closer to each other and narrow the clearance on the circumference on which the outlines of the first roller and the second roller are arranged. Alternatively, it is possible to reduce the level difference in the outline of the wheel, which is caused by the difference in diameter of the first roller and the second roller, by making the diameter of the second roller, which is smaller than that of the first roller, approximate the diameter of the first roller.

Thus, according to the omni-directional wheel related to the one aspect of the present disclosure, it is possible to provide an omni-directional wheel which can simplify the structure of the support member for supporting the multiple rollers which are disposed such that their outlines are arranged on a single circumference.

In the omni-directional wheel of this aspect, the first support parts may support each of a pair of the first rollers so as to be individually rotatable around the axis, and the second support parts may support each of a pair of the second rollers so as to be individually rotatable around the axis.

In this configuration, each of a pair of the first rollers rotates individually. When only one of the first rollers is grounded, the other of the first rollers which is not grounded does not rotate. Similarly, in this configuration, each of a pair of the second rollers rotates individually. When only one of the second rollers is grounded, the other of the second rollers which is not grounded does not rotate.

In this way, compared with the case where one of the rollers which is not grounded is rotated along with the other roller which is grounded, a smaller force is required for a lateral movement and the lateral movement is easier to make.

In the omni-directional wheel of this aspect, each of the multiple rollers may include: a metal core member which is mounted on the support member so as to be rotatable around the axis; and an elastic member of an almost constant thickness which is mounted on the outer circumferential surface of the core member.

In this way, it is possible to counteract the reaction force from the ground surface by means of the metal core member which is not easily deformed by the reaction force, and at the same time, to absorb the impact of the reaction force stably, regardless of the rotational phase of the wheel, by means of the elastic member of an almost constant thickness.

In the omni-directional wheel of this aspect, the rotary members may include a pair of plate members disposed across a clearance in the axle direction, and the multiple support members may be fixed between the pair of plate-like members.

In this way, the multiple rollers can be mounted on the rotary members in the configuration in which the multiple support members are fixed between the pair of plate-like members.

An omni-directional vehicle of one aspect of the present disclosure includes the omni-directional wheel according to the above-described aspects.

In this way, it is possible to provide an omni-directional vehicle which can simplify the structure of the support member for supporting the multiple rollers disposed such that their outlines are arranged on a single circumference.

Advantageous Effects

According to the present disclosure, an advantage is afforded in that an omni-directional wheel, which can support the rollers in a simple structure, and an omni-directional vehicle, which uses this omni-directional wheel, can be provided.

DESCRIPTION OF EMBODIMENTS

In the following, an omni-directional wheel 100 of one embodiment of the present disclosure will be described with reference to the drawings.

The omni-directional wheel 100 according to this embodiment is a wheel which is coupled to a vehicle with other wheels and functions as a driven wheel during travel of the vehicle. The omni-directional wheel 100 is mounted so as to be rotatable around the axle A shown in FIG. 3.

The omni-directional wheel 100 functions as a driven wheel, for example, in a vehicle with two rear wheels as driving wheels and one or two front wheel(s) as driven wheel(s). Alternatively, the omni-directional wheels 100 function in a four-wheeled vehicle as two front driven wheels to which a driving force is transmitted through a belt, etc. from the two rear driving wheels.

As will be described later, the omni-directional wheel 100 includes plate-like members 10 and 11 which are rotatably provided around the axle A, and multiple rollers which have axes perpendicular to the radial direction of the plate-like members 10 and 11 in a plane perpendicular to the axle A. The omni-directional wheel 100 can move along the axle A direction as the multiple rollers rotate around the respective axes upon receiving a force in the axle A direction.

Thus, the omni-directional wheel 100 not only rotates around the axle A but also can move along the axle A direction. Through the combination of rotation around the axle A and movement along the axle A direction, a vehicle having the omni-directional wheel 100 (omni-directional vehicle) is capable of moving in all directions on the ground surface of the vehicle.

Next, the specific configuration of the omni-directional wheel 100 will be described.

Figure 1:
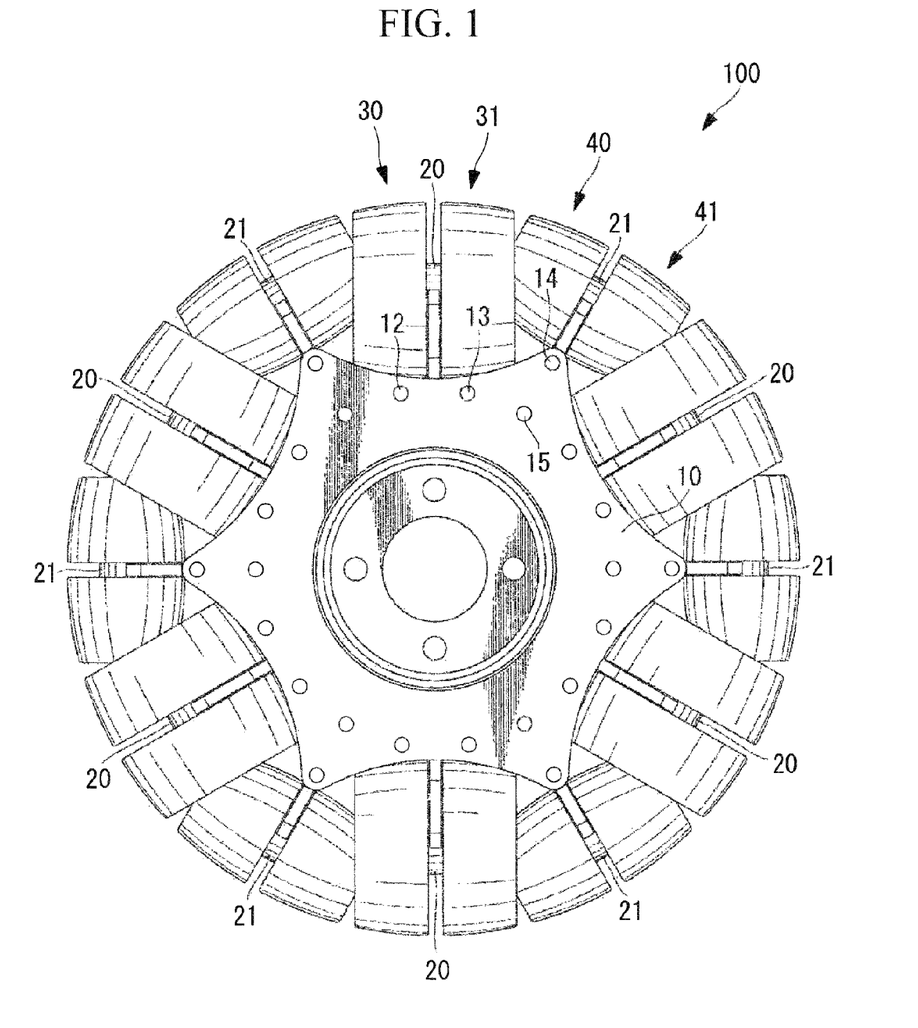
FIG. 1 is a front view showing an omni-directional wheel of one embodiment.
Figure 3:
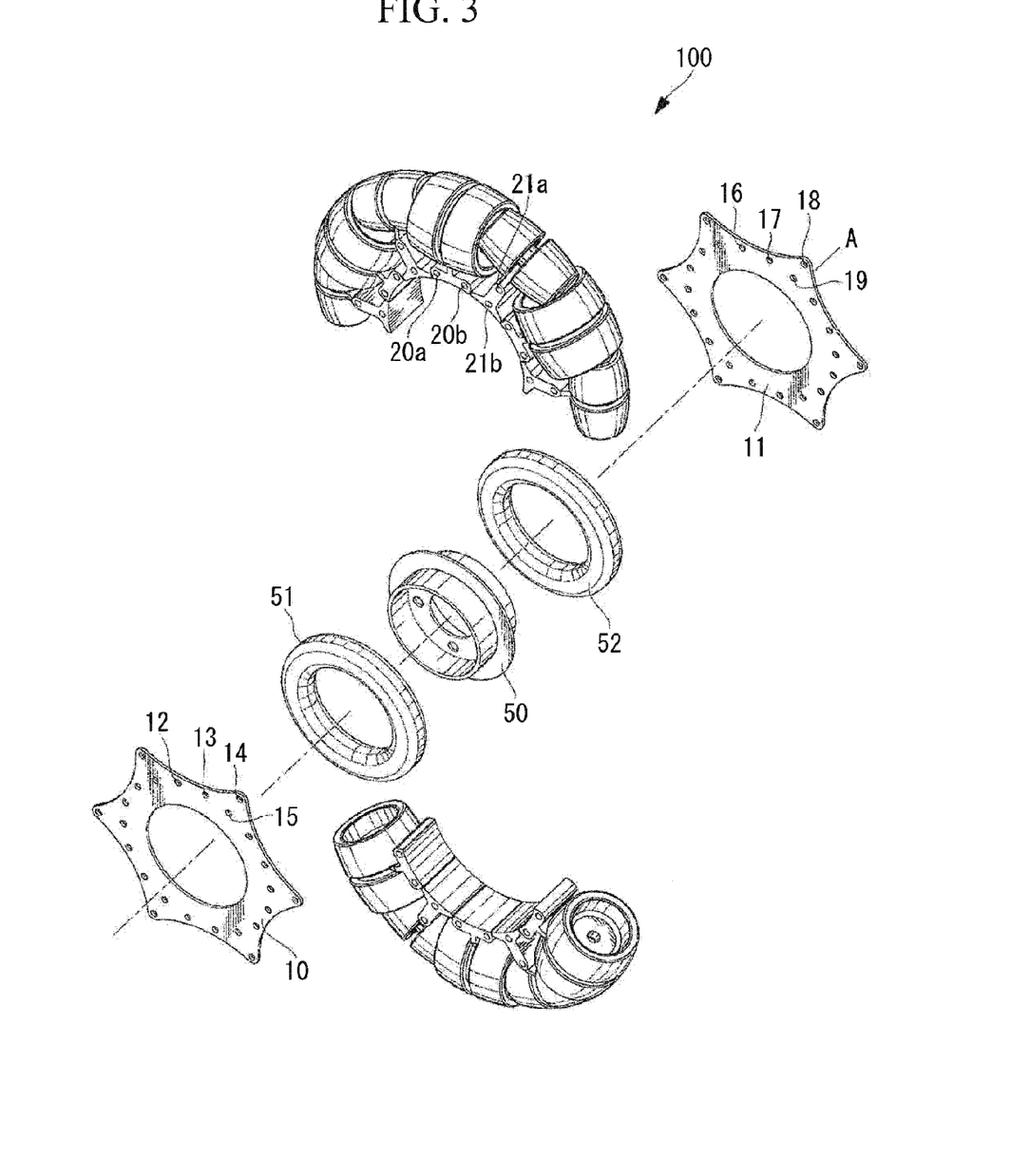
FIG. 3 is an exploded perspective view of the omni-directional wheel shown in FIG. 1.

The plate-like members 10 and 11 (rotary members) shown in FIG. 1 and FIG. 3 are plate-like members which are provided so as to be rotatable around the axle A in a plane perpendicular to the axle A. As shown in FIG. 1, the plate-like member 10 is provided with multiple through-holes 12, 13, 14, and 15 having a female thread formed on the inner surface. As shown in FIG. 3, the plate-like member 11 is provided with multiple through-holes 16, 17, 18, and 19 having a female thread formed on the inner surface. In FIG. 3, for easy understanding of the structure of the omni-directional wheel 100, large-diameter rollers 30 and 31 and small-diameter rollers 40 and 41 to be described later are partially disconnected.

The through-holes 12 and 13 of the plate-like member 10 correspond respectively to fastening holes 20a and 20b of a first support part 20 to be described later. Fastening screws (not shown) having a male thread formed on the outer circumferential surface are inserted into the through-holes 12 and 13 and fastened to the fastening holes 20a and 20b. Thus, the first support part 20 is fixed on the plate-like member 10. The fastening holes 20a and 20b of the first support part 20 penetrate the first support part 20 in the axle A direction shown in FIG. 3 and respectively face the through-holes 16 and 17 of the plate-like member 11. Fastening screws (not shown) having a male thread formed on the outer circumferential surface are inserted into the through-holes 16 and 17 and are fastened to the fastening holes 20a and 20b. Thus, the first support part 20 is fixed on the plate-like member 11.

The through-holes 14 and 15 of the plate-like member 10 correspond respectively to fastening holes 21a and 21b of a second support part 21 to be described later. Fastening screws (not shown) having a male thread formed on the outer circumferential surface are inserted into the through-holes 14 and 15 and fastened to the fastening holes 21a and 21b. Thus, the second support part 21 is fixed on the plate-like member 10. The fastening holes 21a and 21b of the second support part 21 penetrate the second support part 21 in the axle A direction shown in FIG. 3 and respectively face the through-holes 18 and 19 of the plate-like member 11. Fastening screws (not shown) having a male thread formed on the outer circumferential surface are inserted into the through-holes 18 and 19 and fastened to the fastening holes 21a and 21b. Thus, the second support part 21 is fixed on the plate-like member 11.

Thus, the multiple first support parts 20 and the multiple second support parts 21 are fixed while being held between the plate-like member 10 and the plate-like member 11. In addition, a hub 50 and rubber tubes 51 and 52, which are disposed on both sides of the hub 50 in the axle A direction, are fixed while being held between the plate-like member 10 and the plate-like member 11.

The hub 50 is a member coupled with a drive shaft (not shown) which rotates around the axle A. The rubber tubes 51 and 52 are hollow annular members filled with air sealed therein at a predetermined pressure. The inner circumferential surfaces of the rubber tubes 51 and 52 are disposed in contact with the outer circumferential surface of the hub 50. The outer circumferential surfaces of the rubber tubes 51 and 52 are disposed in contact with the inner circumferential surfaces of the first support part 20 and the second support part 21.

Thus, the hub 50 is disposed in contact with the inner circumferential surfaces of the rubber tubes 51 and 52, and the first support parts 20 and the second support parts 21 are disposed in contact with the outer circumferential surfaces of the rubber tubes 51 and 52. Therefore, the driving force around the axle A, which is transmitted from the drive shaft (not shown) to the hub 50, is transmitted through the rubber tubes 51 and 52 to the first support parts 20 and the second support parts 21, causing the omni-directional wheel 100 to rotate around the axle A.

Next, the multiple rollers and the support members supporting the multiple rollers of the omni-directional wheel 100 will be described.

Figure 4:
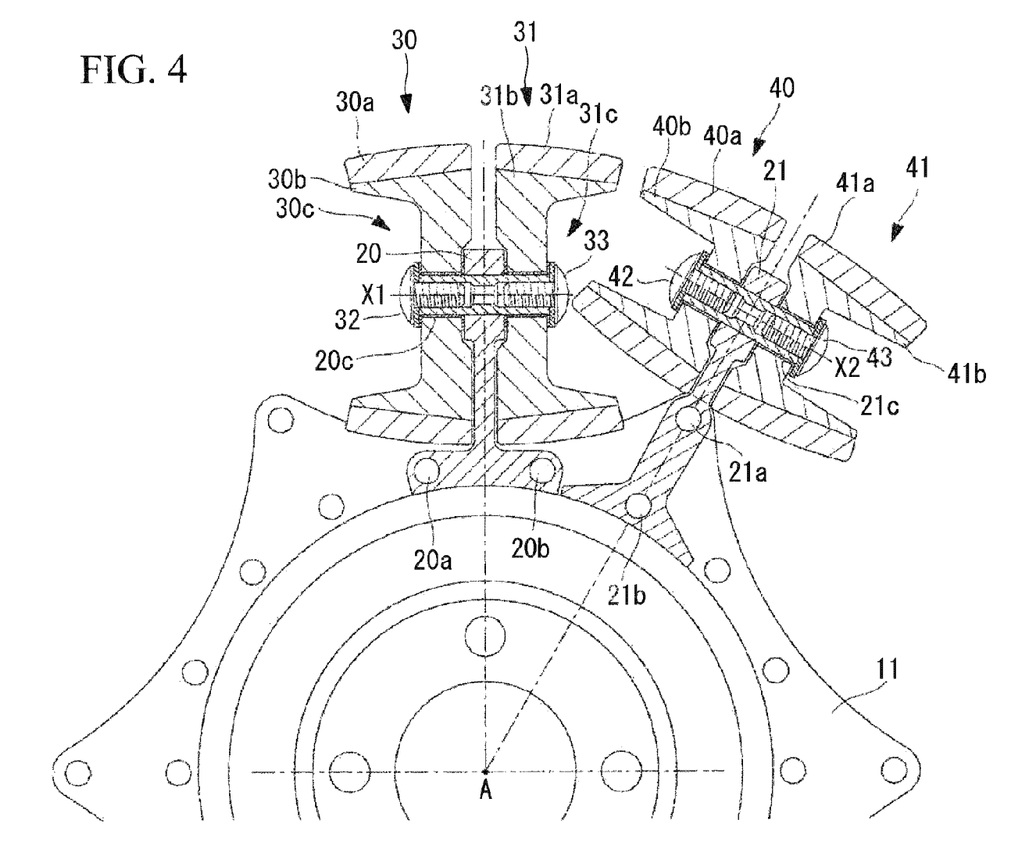
FIG. 4 is a partially enlarged view of the cross-sectional view of the omni-directional wheel shown in FIG. 2.

The omni-directional wheel 100 includes multiple rollers includes: the large-diameter rollers 30 and 31 (first rollers) and the small-diameter rollers 40 and 41 (second rollers). As shown in FIG. 4, a pair of the large-diameter rollers 30 and 31 has the axis X1 extending in a direction perpendicular to the radial direction of the plate-like members 10 and 11 in a plane perpendicular to the axle A. As shown in FIG. 4, a pair of the small-diameter rollers 40 and 41 has the axis X2 extending in a direction perpendicular to the radial direction of the plate-like members 10 and 11 in a plane perpendicular to the axle A.

In the illustration of FIG. 4, the large-diameter rollers 30 and 31 and the small-diameter rollers 40 and 41 to be described later are partially omitted.

As shown in FIG. 1 to FIG. 4, the large-diameter rollers 30 and 31 and the small-diameter rollers 40 and 41 have a shape of which the outline has a curvature equal to the curvature of a circle centered at the axle A. As shown in FIG. 4, each of the large-diameter rollers 30 and 31 is formed in a substantially truncated conical shape with the diameter changing monotonously from one end toward the other end in the axis X1 direction. Similarly, each of the small-diameter rollers 40 and 41 is formed in a substantially truncated conical shape with the diameter changing monotonously from one end toward the other end in the axis X2 direction.

The omni-directional wheel 100 includes the first support part 20 (support member) which allows the pair of large-diameter rollers 30 and 31 to be mounted on the plate-like members 10 and 11 so as to be rotatable around the axis X1. The omni-directional wheel 100 further includes the second support part 21 (support member) which allows the pair of small-diameter rollers 40 and 41 to be mounted on the plate-like members 10 and 11 so as to be rotatable around the axis X2.

As shown in FIG. 1 to FIG. 4, the first support part 20 is disposed at a position where it is held between the pair of large-diameter rollers 30 and 31 having their large diameter-side end faces facing each other, and supports the large-diameter rollers 30 and 31. Similarly, the second support part 21 is disposed at a position where it is held between the pair of small-diameter rollers 40 and 41 having their large diameter-side end faces facing each other, and supports the small-diameter rollers 40 and 41.

Figure 2:
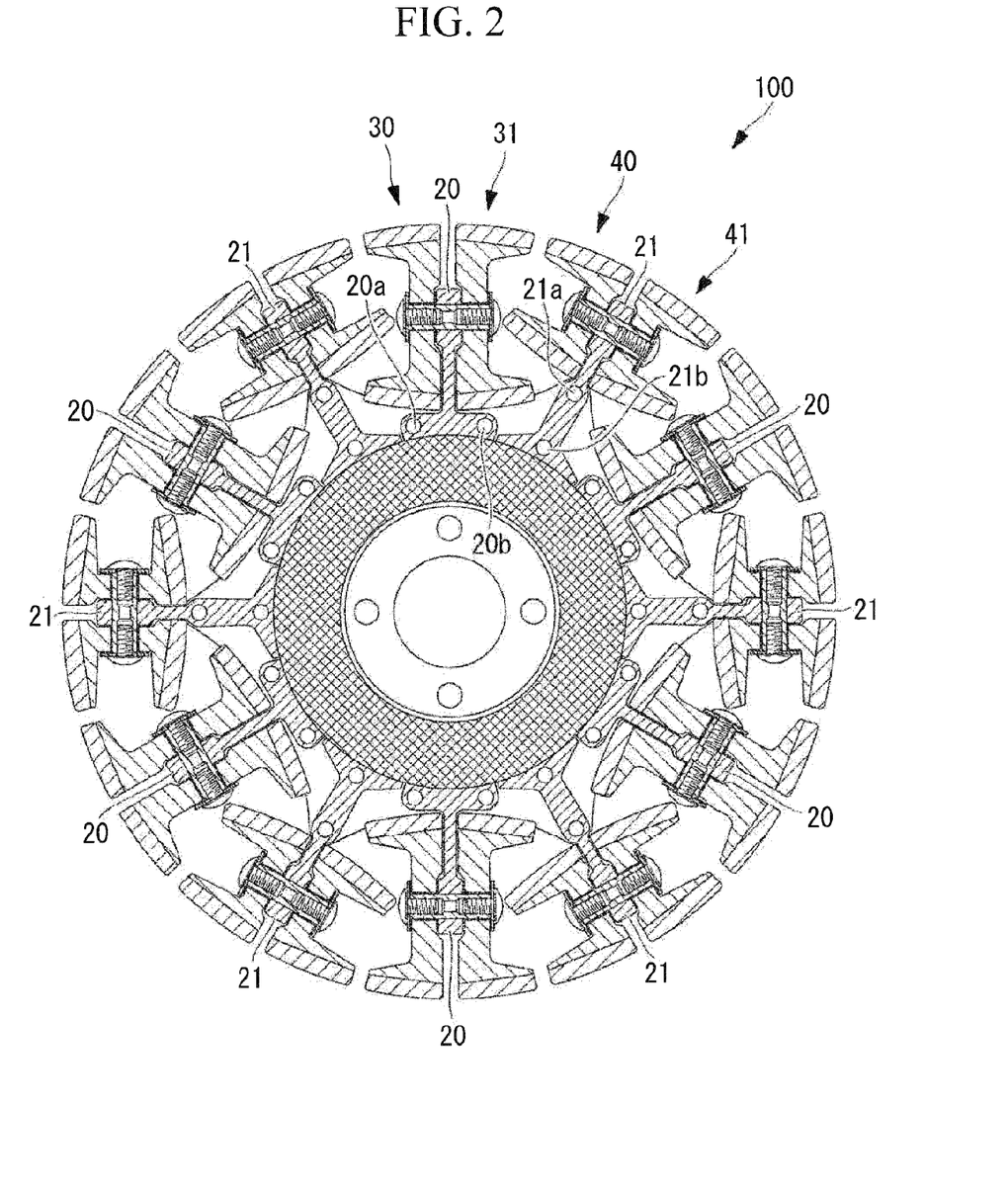
FIG. 2 is a cross-sectional view of the omni-directional wheel shown in FIG. 1.

As shown in FIG. 1 to FIG. 3, the first support parts 20 and the second support parts 21 are alternately disposed in the circumferential direction of the plate-like members 10 and 11. The first support parts 20 and the second support parts 21 are disposed at intervals of 30° around the axle A.

As shown in FIG. 4, the large-diameter rollers 30 and 31 have recessed portions 30c and 31c, respectively, at the center of the small diameter-side end face (near the axis X1). The first support part 20 and the second support part 21 allow the large-diameter roller 31 and the small-diameter roller 40 to be disposed with a part of the small diameter-side end face of the small-diameter roller 40 inserted in the recessed portion 31c of the large-diameter roller 31. In addition, the first support part 20 and the second support part 21 allow the large-diameter roller 31 and the small-diameter roller 40 to be disposed such that the outlines of the large-diameter roller 31 and the small-diameter roller 40 are arranged on a single circumference.

In the illustration of FIG. 4, a part of the small diameter-side end face of the small-diameter roller 40 is inserted in the recessed portion 31c of the large-diameter roller 31; as shown in FIG. 2, the state is the same at the other positions. Accordingly, a part of the small diameter-side end face of the small-diameter roller 41 is inserted in the recessed portion 30c of the large-diameter roller 30. Such insertion of a part of the small diameter-side end face of the small-diameter rollers 40 and 41 into the recessed portions 30c and 31c of the large-diameter rollers 30 and 31 is repeated along the entire circumference around the axle A of the omni-directional wheel 100.

Next, the mechanism of how the large-diameter rollers 30 and 31 rotate around the axis X1 will be described.

Figure 5:
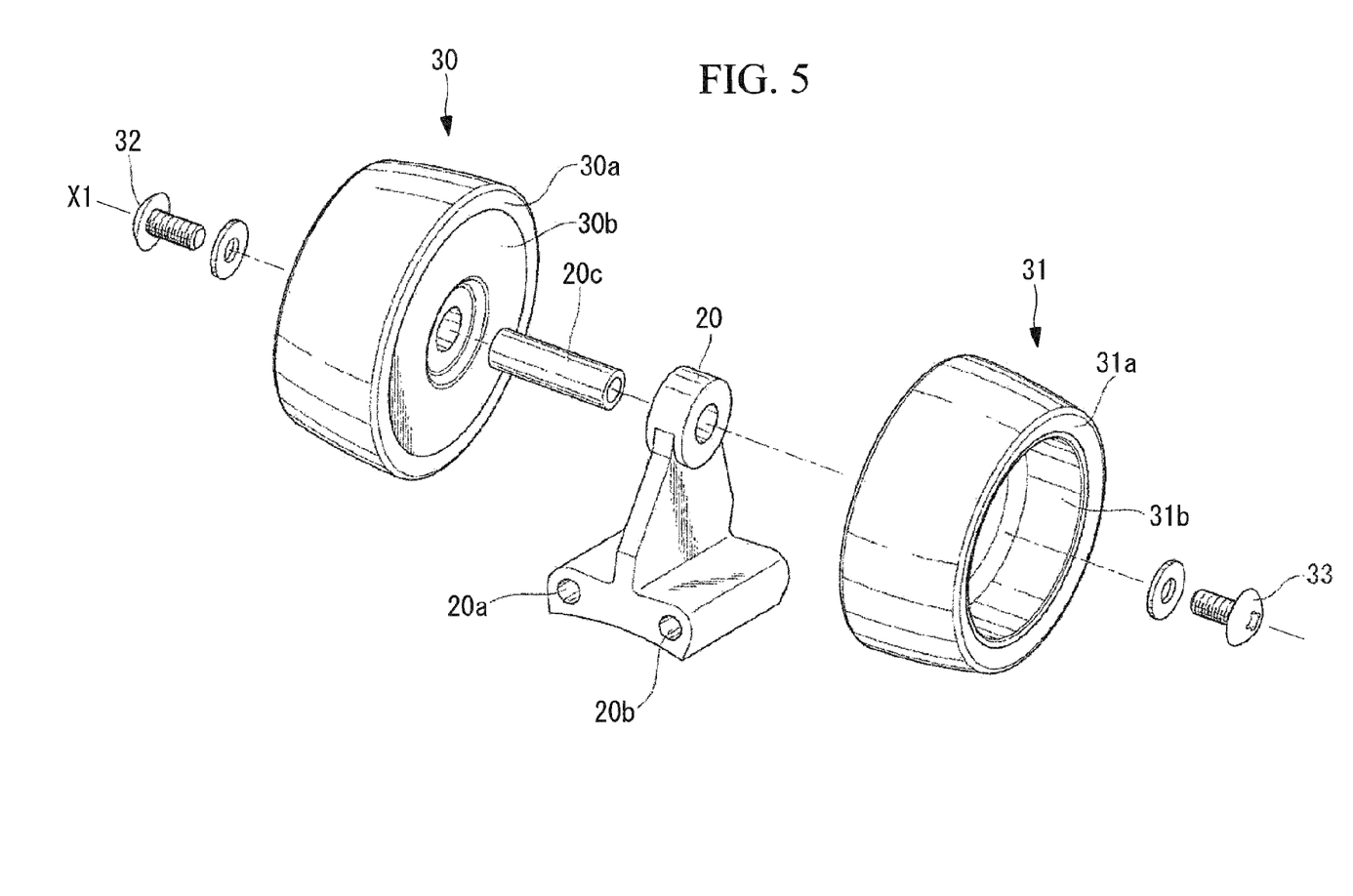
FIG. 5 is an exploded perspective view showing a pair of large-diameter rollers of the omni-directional wheel shown in FIG. 1.

As shown in FIG. 5, the first support part 20 includes a cylindrical shaft member 20c, which is inserted into a through-hole 20d extending in the axis X1 direction and has a fastening hole with a female thread formed on the inner circumferential surface. The ends of the shaft member 20c are inserted into the large-diameter rollers 30 and 31. A fastening screw 32 with a male thread formed on the outer circumferential surface is fastened to the fastening hole of the shaft member 20c while the shaft member 20c is inserted in the large-diameter roller 30. On the other hand, a fastening screw 33 with a male thread formed on the outer circumferential surface is fastened to the fastening hole of the shaft member 20c while the shaft member 20c is inserted in the large-diameter roller 31.

The large-diameter roller 30 includes a metal core member 30b and a rubber tire member 30a (elastic member) of an almost constant thickness which is mounted on the outer circumferential surface of the core member 30b. With the fastening screw 32 fastened on the shaft member 20c, there is a small clearance provided between the outer circumferential surface of the shaft member 20c and a part of the inner circumferential surface of the core member 30b of the large-diameter roller 30. The outer circumferential surface of the shaft member 20c is previously subjected to a process for reducing the friction coefficient. Further, with the fastening screw 32 fastened on the shaft member 20c, there is a small clearance provided in the direction along the axis X1 between the surface of the core member 30b facing the first support part 20 and the surface of the first support part 20 facing the core member 30b.

The large-diameter roller 31 includes a metal core member 31b and a rubber tire member 31a (elastic member) of an almost constant thickness which is mounted on the outer circumferential surface of the core member 31b. With the fastening screw 33 fastened on the shaft member 20c, there is a small clearance provided between the outer circumferential surface of the shaft member 20c and a part of the inner circumferential surface of the core member 31b of the large-diameter roller 31. Further, with the fastening screw 33 fastened on the shaft member 20c, there is a small clearance provided in the direction along the axis X1 between the surface of the core member 31b facing the first support part 20 and the surface of the first support part 20 facing the core member 31b.

In this way, the large-diameter rollers 30 and 31 are disposed with a small clearance provided between the rollers and a part of the outer circumferential surface of the shaft member 20c. The inner circumferential surfaces of the core members 30b and 31b of the large-diameter rollers 30 and 31 and the outer circumferential surface of the shaft member 20c function as a sliding bearing. Thus, the first support part 20 supports each of the pair of large-diameter rollers 30 and 31 so as to be individually rotatable around the axis X1.

Next, the mechanism of how the small-diameter rollers 40 and 41 rotate around the axis X2 will be described.

Figure 6:
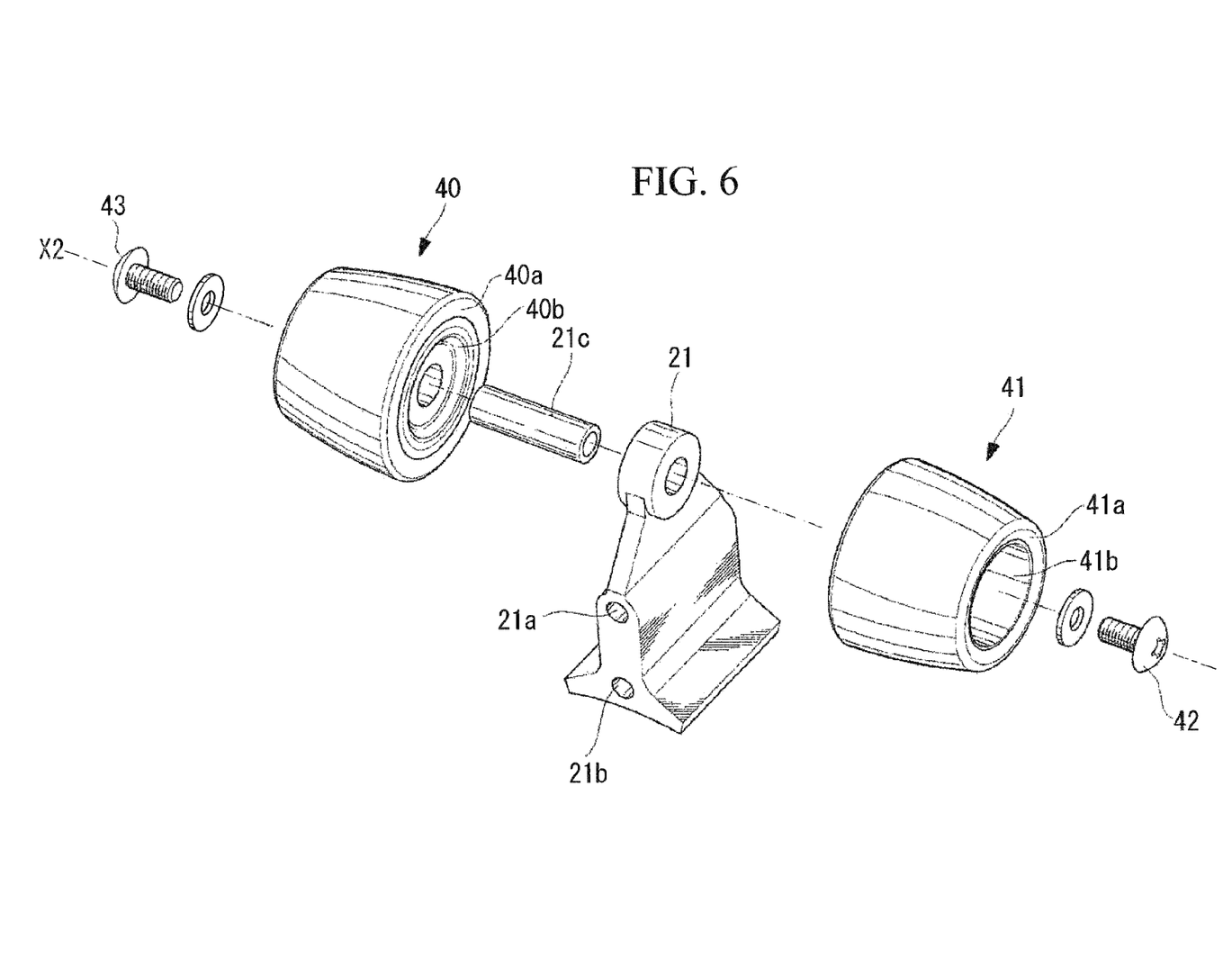
FIG. 6 is an exploded perspective view showing a pair of small-diameter rollers of the omni-directional wheel shown in FIG. 1.

As shown in FIG. 6, the second support part 21 includes a cylindrical shaft member 21c, which is inserted into a through-hole 21d extending in the axis X2 direction and has a fastening hole with a female thread formed on the inner circumferential surface. The ends of the shaft member 21c are inserted into the small-diameter rollers 40 and 41. A fastening screw 42 having a male thread formed on the outer circumferential surface is fastened to the fastening hole of the shaft member 21c while the shaft member 21c is inserted in the small-diameter roller 40. On the other hand, a fastening screw 43 having a male thread formed on the outer circumferential surface is fastened to the fastening hole of the shaft member 21c while the shaft member 21c is inserted in the small-diameter roller 41.

The small-diameter roller 40 includes a metal core member 40b and a rubber tire member 40a (elastic member) of an almost constant thickness which is mounted on the outer circumferential surface of the core member 40b. With the fastening screw 42 fastened on the shaft member 21c, there is a small clearance provided between the outer circumferential surface of the shaft member 21c and a part of the inner circumferential surface of the core member 40b of the small-diameter roller 40. The outer circumferential surface of the shaft member 21c is previously subjected to a process for reducing the friction coefficient. Further, with the fastening screw 42 fastened on the shaft member 21c, there is a small clearance provided in the direction along the axis X2 between the surface of the core member 40b facing the second support part 21 and the surface of the second support part 21 facing the core member 40b.

The small-diameter roller 41 includes a metal core member 41b and a rubber tire member 41a (elastic member) of an almost constant thickness which is mounted on the outer circumferential surface of the core member 41b. With the fastening screw 43 fastened on the shaft member 21c, there is a small clearance provided between the outer circumferential surface of the shaft member 21c and a part of the inner circumferential surface of the core member 41b of the small-diameter roller 41. Further, with the fastening screw 43 fastened on the shaft member 21c, there is a small clearance provided in the direction along the axis X2 between the surface of the core member 41b facing the second support part 21 and the surface of the second support part 21 facing the core member 41b.

Thus, the small-diameter rollers 40 and 41 are disposed with a small clearance provided between the rollers and a part of the outer circumferential surface of the shaft member 21c. The inner circumferential surfaces of the core members 40b and 41b of the small-diameter rollers 40 and 41 and the outer circumferential surface of the shaft member 21c function as a sliding bearing. Thus, the second support part 21 supports each of the pair of small-diameter rollers 40 and 41 so as to be individually rotatable around the axis X2.

As has been described, according to the omni-directional wheel 100 of this embodiment, the pair of large-diameter rollers 30 and 31 and the pair of small-diameter rollers 40 and 41, each having their large diameter-side end faces facing each other, are supported by the first support parts 20 and the second support parts 21 which are alternately disposed in the circumferential direction of the plate-like members 10 and 11 (rotary members) provided rotatably around the axle A. Since each of these first support parts 20 and second support parts 21 is disposed at a position where it is held between a pair of the rollers having their end faces facing each other, the support parts are not required to have a special shape which is curved so as to fit the shape of the recessed portions 30c and 31c in the small diameter-side end face of the large-diameter rollers 30 and 31. Therefore, it is possible to simplify the structure of the first support part 20 and the second support part 21 for supporting the multiple large-diameter rollers 30 and 31 and small-diameter rollers 40 and 41 which are disposed such that their outlines are arranged on a single circumference.

Moreover, according to the omni-directional wheel 100 of this embodiment, each of the first support parts 20 and the second support parts 21 is disposed at a position where it is held between a pair of rollers having their end faces facing each other, and not at a position where the small diameter-side end face of the large-diameter rollers 30 and 31 and the small diameter-side end face of the small-diameter rollers 40 and 41 face each other. Therefore, it is possible to bring the large-diameter rollers 30 and 31 and the small-diameter rollers 40 and 41 closer to each other and narrow the clearance on the circumference on which the outlines of the large-diameter rollers 30 and 31 and the small-diameter rollers 40 and 41 are arranged. Alternatively, it is possible to reduce the level difference in the outline of the wheel, which is caused by the difference in diameter of the large-diameter rollers 30 and 31 and the small-diameter rollers 40 and 41, by making the diameter of the small-diameter rollers 40 and 41, which is smaller than that of the large-diameter rollers 30 and 31, approximate the diameter of the large-diameter rollers 30 and 31.

Thus, according to the omni-directional wheel 100 of this embodiment, it is possible to provide the omni-directional wheel 100 which can simplify the structure of the first support part 20 and the second support part 21 for supporting the multiple rollers which are disposed such that their outlines are arranged on a single circumference.

In the omni-directional wheel 100 of this embodiment, the first support part 20 supports each of the pair of large-diameter rollers 30 and 31 so as to be individually rotatable around the axis X1, while the second support part 21 supports each of the pair of small-diameter rollers 40 and 41 so as to be individually rotatable around the axis X2.

Thus, each of the pair of large-diameter rollers 30 and 31 rotates individually. When only the large-diameter roller 30 is grounded, the other large-diameter roller 31 which is not grounded does not rotate. Similarly, each of the pair of small-diameter rollers 40 and 41 rotates individually. When only the small-diameter roller 40 is grounded, the other small-diameter roller 41 which is not grounded does not rotate.

In this way, compared with the case where one of rollers which is not grounded is rotated along with the other roller which is grounded, a smaller force is required for a movement in the direction along the axle A (lateral direction), and the movement in the direction along the axle A (lateral direction) is easier to make.

In the omni-directional wheel 100 of this embodiment, the multiple large-diameter rollers 30 and 31 each include the metal core member 30b or 31b which is mounted on the first support part 20 so as to be rotatable around the axis X1, and the rubber tire member 30a or 31a (elastic member) of an almost constant thickness which is mounted on the outer circumferential surface of the core member 30b or 31b.

In this way, it is possible to counteract the reaction force from the ground surface by means of the metal core members 30b and 31b which are not easily deformed by the reaction force, and at the same time, to absorb the impact of the reaction force stably, regardless of the rotational phase of the wheel, by means of the rubber tire members 30a and 31a of an almost constant thickness.

Similarly, in the omni-directional wheel 100 of this embodiment, the multiple small-diameter rollers 40 and 41 each include the metal core member 40b or 41b which is mounted on the second support member 21 so as to be rotatable around the axis X2, and the rubber tire member 40a or 41a (elastic member) of an almost constant thickness which is mounted on the outer circumferential surface of the core member 40b or 41b.

In this way, it is possible to counteract the reaction force from the ground surface by means of the metal core members 40b and 41b which are not easily deformed by the reaction force, and at the same time, to absorb the impact of the reaction force stably, regardless of the rotational phase of the wheel, by means of the rubber tire members 40a and 41a of an almost constant thickness.

The invention claimed is:

1. An omni-directional wheel comprising:
    a rotary member rotatably provided around an axle;
    a plurality of rollers which have axes extending in a direction perpendicular to a radial direction of the rotary member in a plane perpendicular to the axle; and
    support members which allow the rollers to be mounted on the rotary member so as to be rotatable around the respective axes, wherein
    the rollers are formed in a substantially truncated conical shape, of which an outline has a curvature equal to the curvature of a circle centered at the axle, and of which a diameter changes monotonously from one end toward the other end in an axial direction, and the rollers include first rollers and second rollers each having a smaller diameter than that of the first rollers,
    the first rollers each include a recessed portion at a center of the small diameter-side end face,
    the support members include first support parts that support the first rollers, each of the first support parts being disposed at a position where the first support part is held between a pair of the first rollers having large diameter-side end faces facing each other; and second support parts that support the second rollers, each of the second support parts being disposed at a position where the second support part is held between a pair of the second rollers having large diameter-side end faces facing each other,
    wherein the first support parts and the second support parts are alternately disposed in a circumferential direction of the rotary member, and
    wherein the first rollers and the second rollers are disposed such that outlines are arranged on a single circumference with a part of the small diameter-side end face of the second rollers partially inserted into the recessed portion of the first rollers.

2. The omni-directional wheel according to claim 1, wherein
    the first support part supports each of a pair of the first rollers so as to be individually rotatable around the axis, and
    the second support part supports each of a pair of the second rollers so as to be individually rotatable around the axis.

3. The omni-directional wheel according to claim 1, wherein the rollers each comprise: a metal core member, which is mounted on the support member so as to be rotatable around the axis; and an elastic member of an almost constant thickness, which is mounted on the outer circumferential surface of the core member.

4. The omni-directional wheel according to claim 2, wherein the rollers each comprise: a metal core member, which is mounted on the support member so as to be rotatable around the axis; and an elastic member of an almost constant thickness, which is mounted on the outer circumferential surface of the metal core member.

5. The omni-directional wheel according to claim 1, wherein
    the rotary members include a pair of plate-like members disposed across a clearance in the axle direction, and
    the support members are fixed between the pair of plate-like members.

6. The omni-directional wheel according to claim 2, wherein
    the rotary members include a pair of plate-like members disposed across a clearance in the axle direction, and
    the support members are fixed between the pair of plate-like members.

7. The omni-directional wheel according to claim 3, wherein
    the rotary members include a pair of plate-like members disposed across a clearance in the axle direction, and
    the support members are fixed between the pair of plate-like members.

8. An omni-directional vehicle comprising the omni-directional wheel according to claim 1.

* * * * *